Patented Apr. 11, 1939

2,153,954

UNITED STATES PATENT OFFICE 2,153,954

PLASTICIZATION OF RUBBER HYDROHALIDE

William C. Calvert, Chicago, Ill., assignor to Wingfoot Corporation, Akron, Ohio, a corporation of Delaware No Drawing. Application September 23, 1936, Serial No. 102,223

4 Claims. (Cl. 260—111)

This invention relates to the plasticization of a rubber hydrohalide such as rubber hydrochloride or rubber hydrobromide. It includes the plasticization of such rubber hydrohalides to increase their tear resistance and increase their durability and shock resistance, and more particularly to the plasticization of rubber hydrochloride pellicles to increase both their resistance to tear and their durability and in certain instances without greatly increasing their moisture transmission. The preferred plasticizers are butyl stearate or other alkyl ester of a fatty acid, dibutyl phthalate or other alkyl ester of phthalic acid or a hydrogenated phthalic acid and ethyl abietate or other ester of an acid derived from a vegetable oil.

Rubber hydrochloride may be used for many purposes. Films of rubber hydrochloride may be used in packaging, in the manufacture of waterproof garments such as rain-coats, etc., and for these and other purposes films having different properties may be obtained by the use of different plasticizers. Certain plasticizers are toxic and these must be avoided in the plasticization of rubber hydrochloride to be used in the packaging of foodstuffs. Films for packaging purposes are advantageously plasticized to increase their tear resistance. For certain packaging operations films having both greater tear resistance and greater durability are desirable as well as shock resistance. In the manufacture of rain-coats durability and likewise tear resistance are important properties. Plasticizers which increase the moisture transmission of the rubber hydrochloride may be suitable for garment manufacture whereas a similar increase in moisture transmission may be undesirable in rubber hydrochloride to be used for the packaging of foodstuffs, tobaccos, etc. It is evident from this that different plasticizers may be selected for the rubber hydrochlorides designed for different uses.

By "tear resistance" is meant the resistance of a torn rubber hydrochloride film to further tearing. The figures for tear resistance given below were obtained on a machine in which a pellicle of the rubber hydrochloride with a slight tear was subjected to further tearing by the swinging of a pendulum. The higher the figure the greater the resistance to tear. By "durability" is meant the resistance to damage by repeated flexing. The figures given below were obtained by repeated flexing of a rubber hydrochloride pellicle and represent the number of flexes which the film withstood on a mechanical flexing device without the appearance of a hole in the pellicle. By "shock resistance" is meant the property of non-brittleness or toughness as measured by the resistance to impact or shock, i. e. the energy absorption on rupture under impact conditions as by dropping a ball or other shaped weight or striking with a pendulum as for example with a Charpy type impact tester. The figures given below are to be compared with those for a control which contained no plasticizer and had a tear resistance of 67, durability of 735 and a moisture transmission of 8.57 grams per square meter in 24 hours.

A preferred plasticizer is butyl stearate. Different amounts of the butyl stearate may be employed to produce films of different properties. The following figures indicate the properties of a pellicle plasticized with 5%, 7.5% and 10% of butyl stearate respectively.

| Plasticizer | Tear resistance | Durability | Moisture transmission |
|---|---|---|---|
| 5% butyl stearate | 72 | 1300 | 10.2 |
| 7.5% butyl stearate | 87 | 1500 | 14.5 |
| 10% butyl stearate | 243 | 9400 | 20.9 |

It will be seen from this table that the tear resistance and durability increase with increased amounts of butyl stearate. Five percent of butyl stearate in a rubber hydrochloride used for coating paper gave good results. Butyl stearate increases the moisture transmission somewhat. This may be overcome by adding paraffin. For example, a film plasticized with 8% of butyl stearate and 2% of paraffin had a moisture transmission of only 7.0 whereas it had a tear resistance of 112 and a durability of 3200. Other plasticizers may be added with butyl stearate. For example a pellicle plasticized with 5% butyl stearate and 5% of chlorinated paraffin had a tear resistance of 101, a durability of 2250 and a moisture transmission of 15.0. Other esters of butyl stearate may be employed such as propyl stearate, amyl stearate, hexyl stearate, heptyl stearate, or decyl stearate. One may even employ the methyl and ethyl esters but the higher esters will normally be preferred. The invention is not limited to the use of alkyl esters since cyclo hexyl stearate, glycol stearate and glyceryl stearate may be employed. Esters of other fatty acids than stearic acid may be used to advantage, such as esters of oleic acid, palmitic acid, etc., for example, ethyl oleate, butyl oleate, heptyl oleate, butyl palmitate, etc. For many purposes, a small amount of plasticizer such as 1 to 3% of butyl stearate will be found satisfactory. A small amount of paraffin may be used with a small amount of a fatty acid ester, such for example as 1% paraffin with 3% of butyl stearate.

Dibutyl phthalate is a very desirable plasticizer although in general it should be avoided in rubber hydrohalide used for the packaging of foodstuffs. The shock and tear resistance and durability of a rubber hydrochloride pellicle plasticized with dibutyl phthalate increase with increasing amounts of dibutyl phthalate. The moisture transmission also increases somewhat.

| Plasticizer | Tear resistance | Durability | Moisture transmission |
|---|---|---|---|
| 5% dibutyl phthalate | 73 | 900 | 9.0 |
| 10% dibutyl phthalate | 113 | 1000 | 16.2 |
| 20% dibutyl phthalate | 272 | 24000 | 29.6 |

It will be generally desirable to avoid the use of the low-boiling dimethyl and diethyl esters of phthalic acid. The propyl, amyl, heptyl, octyl, etc. esters may be used. Esters of hydrogenated phthalic acid may likewise be employed, such for example as diamyl hexahydro phthalate. Mixed esters may be used, such as iso-propyl-butyl phthalate and glyceryl butyl phthalate. The phthalate ester may be mixed with another plasticizer if desired. For example, 1% paraffin and 3% butyl stearate may be used.

Esters of vegetable oil acids such as esters of abietic acid may be used. Ethyl abietate, for example gave the following results:

| Plasticizer | Tear resistance | Durability | Moisture transmission |
|---|---|---|---|
| 10% ethyl abietate | 76 | 900 | 10.2 |
| 20% ethyl abietate | 95 | 1900 | 14.4 |
| 30% ethyl abietate | 160 | 5000 | 11.2 |

It is to be noted that the moisture transmission increases but slowly with the addition of ethyl abietate.

The phosphates may be employed as plasticizers, but in general it is necessary to use a large amount of phosphate to materially improve the tear resistance and this increases the moisture transmission to such an extent that unless some other plasticizer is added with the phosphate to maintain low moisture transmission it will not in general be desirable to employ phosphate as a plasticizer where low moisture transmission is desirable.

| Plasticizer | Tear resistance | Durability | Moisture transmission |
|---|---|---|---|
| 10% tributyl phosphate |  | 1700 | 19.0 |
| 20% tributyl phosphate |  | 5000 | 18.7 |
| 10% triphenyl phosphate | 90 | 1525 | 15.3 |
| 20% triphenyl phosphate | 292 | 10000 | 33.5 |
| 20% triphenyl thio phosphate | 215 | 11000 | 23.9 |
| 25% triphenyl thio phosphate | 1075 | 13000 | 20.8 |

Other plasticizers which impart improved shock and tear resistance and durability to a rubber hydrochloride pellicle but which are advantageously used in large amounts to give desired improvements (although in large amounts they increase the moisture-transmission) are chlorinated paraffin and dibutyl tartrate.

| Plasticizer | Tear resistance | Durability | Moisture transmission |
|---|---|---|---|
| 10% chlorinated paraffin | 124 | 1700 | 12.2 |
| 20% chlorinated paraffin | 261 | 17000 | 18.8 |
| 30% chlorinated paraffin | 5750 | 20000 | 25.3 |
| 10% dibutyl tartrate | 79 | 1000 | 15.8 |
| 20% dibutyl tartrate | 168 |  | 23.9 |
| 30% dibutyl tartrate | 3600 |  | 100.7 |

I have experimented with many plasticizers of different chemical composition including vegetable oils, such as linseed oil, China-wood oil, castor oil, and also mineral oils, chlorinated compounds such as chlorinated poly phenyls and chlorinated naphthalene, waxes such as paraffin, ceresin, Japan wax, and spermaceti and of all the various materials employed the preferred plasticizers for increased shock and tear resistance and durability appear to be compounds such as butyl stearate, dibutyl phthalate and ethyl abietate.

The rubber hydrochloride pellicles to which the above tests refer were made by a process similar to that described in my U. S. Patent 1,989,632, and contained about 29–30% chlorine, but the invention is not limited to rubber hydrochloride so prepared. The rubber hydrochloride may contain a photochemical inhibitor such as hexamethylene tetramine or any of the other compounds mentioned in that patent but the inclusion of such an inhibitor is not essential to the present invention. The rubber hydrochloride may contain more or less chlorine or bromine. It may be halogenated as well as hydrohalogenated, such as a chlorinated rubber chloride. The plasticizers may be added to pellicles of different thickness although the advantages of plasticization are particularly pronounced in the plasticization of pellicles of a thickness of about one to two thousandths of an inch.

This application is in part a continuation of my applications 12,026 filed March 20, 1935; 31,091 filed July 12, 1935; 755,389 filed November 30, 1934 and 43,219 filed October 2, 1935.

I claim:
1. A plasticized rubber hydrochloride pellicle of a thickness of about one to two thousandths of an inch which comprises plasticizer of such a character and in such an amount as to increase the durability and tear resistance of the pellicle to a degree desirable in the manufacture of garments such as rain coats.
2. A rubber hydrochloride pellicle of a thickness of about one to two thousandths of an inch plasticized with at least about 10% of butyl stearate.
3. A rubber hydrochloride pellicle of a thickness of about one to two thousandths of an inch plasticized with at least about 20% of dibutyl phthalate.
4. A rubber hydrochloride pellicle of a thickness of about one to two thousandths of an inch plasticized with at least about 30% of ethyl abietate.

WILLIAM C. CALVERT.